United States Patent [19]

Mark

[11] 4,195,157

[45] Mar. 25, 1980

[54] POLYCARBONATE COMPOSITIONS HAVING IMPROVED BARRIER PROPERTIES

[75] Inventor: Victor Mark, Evansville, Ind.

[73] Assignee: General Electric Company, Pittsfield, Mass.

[21] Appl. No.: 882,240

[22] Filed: Feb. 28, 1978

[51] Int. Cl.$^2$ ............................................. C08G 63/62
[52] U.S. Cl. ................................... 528/174; 525/469; 525/470; 528/128; 528/191; 528/202; 528/204
[58] Field of Search ............... 26/47 XA, 49, 77.5 D, 26/463, 860; 528/174, 202, 128

[56] References Cited

U.S. PATENT DOCUMENTS 4,075,119  2/1978  Schmidt et al. .................... 252/182

FOREIGN PATENT DOCUMENTS 2,520,316  11/1976  Fed. Rep. of Germany ..... 260/47 XA Primary Examiner—Theordore E. Pertilla
Attorney, Agent, or Firm—Salvatore C. Mitri; William F. Mufatti

[57] ABSTRACT

High molecular weight aromatic polycarbonates, obtained from halogenated diphenols, having improved water vapor transmission and gas barrier properties as well as improved flame retardance.

10 Claims, No Drawings

POLYCARBONATE COMPOSITIONS HAVING IMPROVED BARRIER PROPERTIES

This invention relates to aromatic polycarbonate resins having improved barrier properties; i.e., low water vapor transmission and low gas permeability, as well as improved flame retardance.

BACKGROUND OF THE INVENTION

Polycarbonate polymers are known as being excellent molding materials since products made therefrom exhibit such properties as high impact strength, toughness, high transparency, wide temperature limits (high impact resistance below $-60°$ C. and a UL thermal endurance rating of $115°$ C. with impact), good dimensional stability, good creep resistance, and the like. It would be desirable to add to this list of properties those of low water vapor transmission and low gas permeability to enable the aromatic polycarbonates to be used, among other applications, to form containers and film wraps for foods, beverages, cosmetics, and the like. In particular, food and beverage containers made from aromatic polycarbonates having these added barrier properties would be more economical as they would be capable of reuse and would thus also help reduce the impact of environmental waste occasioned by broken glass and discarded, non-reusable containers.

Under certain conditions, such containers and film wraps can be used for materials whose exposure to fire hazard should be minimized. Therefore, it would also be desirable to impart to these containers and film wraps the additional property to flame resistance or fire retardance without sacrificing low water vapor transmission and low gas permeability properties.

It is known to obtain polycarbonates that contain halogenated monomers as their main, polymeric building blocks. For example, U.S. Pat. No. 3,062,781 discloses flame retardant halogenated polycarbonates but the only dihalogenated diphenol disclosed is dichlorobisphenol-A as all the other halogenated diphenols disclosed are tetrahalogenated diphenols. The statement is made that the halogenated polycarbonates obtained from these halogenated diphenols also show "reduced permeability to steam" and that "these properties are the more distinct the higher the halogen content is of the new polycarbonates" (Col. 5, lines 16 and 18-19).

U.S. Pat. No. 3,312,659 discloses a dichloromethylene bisphenol polycarbonate but does not include data characterizing the polymer.

U.S. Pat. No. 3,312,662 discloses the ester chloride of a dichlorinated polycarbonate, but also does not include data characterizing the polymer.

German Pat. No. P25 20 317.2 discloses that halogenated polycarbonates can be obtained from preparing halogenated monomers containing mixtures of unreacted bisphenols and statistical mixtures of halogenated bisphenols. The halogenated bisphenols comprise, primarily, tri- and tetrahalogenated bisphenol.

In general, these prior art references recognize that flame retardance can be imparted to polyesters by halogenating the monomeric building blocks from which they are obtained.

SUMMARY OF THE INVENTION

It has now been found that improved water vapor transmission and gas barrier properties can be imparted to high molecular weight, aromatic polycarbonate resins without sacrificing the flame retardant properties of these polycarbonates. In general, this is accomplished by controlling the degree to which the monomeric building block comprising the polycarbonate is halogenated. Accordingly, the monomers can be halogenated so that there is obtained either an almost pure dihalodiphenol or a predetermined statistical mixture comprising predominantly mono- and dihalogenated monomer together with some unreacted monomer.

Preferably, these halogenated monomers and monomeric mixtures can be continuously obtained by either: (1) dissolving or suspending a monomer in a solvent system comprising methylene chloride and water and thereafter metering a halogen gas into the solvent system; or, (2) dissolving or suspending a monomer in methylene chloride and then contacting the suspended monomer with sulfuryl chloride and, optionally, introducing another halogen therein; or, (3) dissolving or suspending a monomer in methylene chloride and then introducing a halogen therein while concurrently purging the reaction with an inert gas. These processes are described in co-pending applications Ser. No. 882,192, filed Feb. 28, 1978, Ser. No. 882,242, filed Feb. 28, 1978, and Ser. No. 882,191, filed Feb. 28, 1978, respectively, all of which are assigned to the same assignee of this case.

While any of the halogens can be employed, chlorine and bromine are preferred and the halogenated monomers can also include a lower alkyl moiety. Thus, the monomers that can be used to obtain the high molecular weight aromatic polycarbonates of the invention can be represented by the general formula

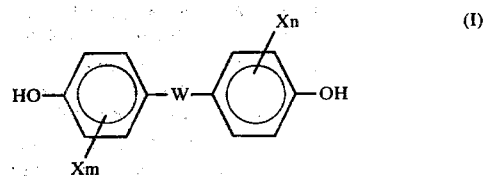

wherein Xm and Xn can each independently be a halogen, a $C_1$–$C_4$ alkyl, and mixtures thereof provided that at least either Xm or Xn is a halogen; m and n are each 0.1–2.5 with the proviso that when either Xm or Xn is a halogen, then m+n equal at least 0.1 and no more than about 2.5; and, W can be a member selected from the following group:

(a) —(—CH$_2$)$_r$ wherein r is an integer of 1–10 with the proviso that when Xm and Xn are chlorine and m and n are each 1, r is 0 or 2–10;

(b)

wherein R is a member of the group consisting of $C_1$–$C_{10}$ alkyl and $C_6$–$C_{14}$ aryl;

(c)

wherein R and R' can each independently be the same as R in (b) above;
(d)

wherein p and q can each independently be the 0–1; and,
(e) —O—.

In formula I above, the values for m and n represent the number of halogen and alkyl substituents in the monomer.

Typical of some of the monomers that can be employed in this invention are bisphenol-A, (2,2-bis(4-hydroxyphenyl)propane), bis(4-hydroxyphenyl)methane, 2,2-bis(4-hydroxy-3-methylphenyl)-propane, 4,4-bis(4-hydroxyphenyl)heptane, 1,1-bis(4-hydroxyphenyl)ethane, 3-methyl-2,2-bis(4-hydroxyphenyl)propane, bis(4-hydroxyphenyl)sulfone, bis(4-hydroxyphenyl)ether, and the like. Other non-halogenated monomers of the bisphenol type can also be used such as are disclosed in U.S. Pat. Nos. 2,999,835, 3,028,365 and 3,334,154.

Of course, it is possible to employ two or more different monomers or a copolymer with a glycol or with hydroxy or acid terminated polyester, or with a dibasic acid in the event a carbonate copolymer or interpolymer rather than a homopolymer is desired for use in preparing the aromatic polycarbonate. Blends of any of these materials can also be used to obtain the aromatic polycarbonates.

These halogenated/alkylated monomers can then be employed to obtain the high molecular weight aromatic polycarbonates of the invention which can be linear or branched homopolymers or copolymers as well as mixtures thereof or polymeric blends and generally have an intrinsic viscosity (IV) of about 0.40–1.0 dl/g as measured in methylene chloride at 25° C. These high molecular weight aromatic polycarbonates can be typically prepared by reacting a monomer with a carbonate precursor.

The carbonate precursor used can be either a carbonyl halide, a carbonate ester or a haloformate. The carbonyl halides can be carbonyl bromide, carbonyl chloride and mixtures thereof. The carbonate esters can be diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonate such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates that can be used include bis-haloformates of dihydric phenols (bis-chloroformates of hyroquinone, etc.) of glycols (bishaloformates of ethylene glycol, neopentyl glycol, polyethylene glycol) etc. While other carbonate precursors will occur to those skilled in the art, carbonyl chloride, also known as phosgene, is preferred.

Also included are the polymeric derivatives of a dihydric phenol, a dicarboxylic acid and carbonic acid such as are disclosed in U.S. Pat. No. 3,169,121 which is incorporated herein by reference.

Molecular weight regulators, acid acceptors and catalysts can also be used in obtaining the aromatic polycarbonates of this invention. The useful molecular weight regulators include monohydric phenols such as phenol, chroman-I, paratertiarybutylphenol, parabromophenol, primary and secondary amines, etc. Preferably, phenol is employed as the molecular weight regulator.

A suitable acid acceptor can be either an organic or an inorganic acid acceptor. A suitable organic acid acceptor is a tertiary amine such as pyridine, triethylamine, dimethylaniline, tributylamine, etc. The inorganic acid acceptor can be either a hydroxide, a carbonate, a bicarbonate, or a phosphate of an alkali or alkaline earth metal.

The catalysts which can be employed are those that typically aid the polymerization of the monomer with phosgene. Suitable catalysts include tertiary amines such as triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included herein are branched polycarbonates wherein a polyfunctional aromatic compound is reacted with the monomer and carbonate precursor to provide a thermoplastic randomly branched polycarbonate. These polyfunctional aromatic compounds contain at least three functional groups which are carboxyl, carboxylic anhydride, haloformyl, or mixtures thereof. Illustrative of polyfunctional aromatic compounds which can be employed include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are trimellitic anhydride and trimellitic acid or their acid halide derivatives.

Blends of linear and branched aromatic polycarbonates are also included within the scope of this invention.

Other well known materials can also be employed for their intended function and include such materials as anti-static agents, mold release agents, thermal stabilizers, ultraviolet light stabilizers, reinforcing fillers such as glass and other inert fillers, foaming agents, and the like.

Accordingly, the high molecular weight aromatic polycarbonates of the invention can be represented by the general formula

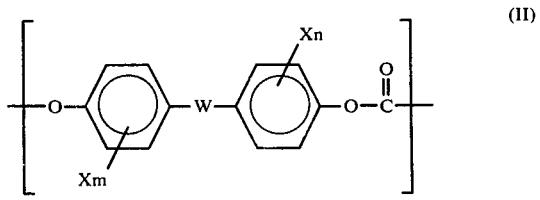

wherein Xm, Xn, m, n and W are the same as identified in formula I above.

PREFERRED EMBODIMENT OF THE INVENTION

The following examples are set forth to more fully and clearly illustrate the present invention and are intended to be, and should be construed as being, exemplary and not limitative of the invention. Unless otherwise stated, all parts and percentages are by weight.

In the following examples, the flame retardancy of each of the polycarbonates obtained was also determined by feeding the polycarbonates into an extruder which was operated at about 265° C. and the extrudates were each comminuted into pellets.

The pellets were then injection molded at about 315° C. into test bars of about 5 in. by ½ in. by about 1/16–⅛ in. thick. The test bars (5 for each polycarbonate) were then subject to the test procedure set forth in Underwriters' Laboratories, Inc. Bulletin UL-94, Burning Test for Classifying Materials. In accordance with this test procedure, materials so investigated are rated earlier V-0, V-I or V-II based on the results of 5 specimens. The criteria for each V (for vertical) rating per UL-94 is briefly as follows:

"V-0": Average flaming and/or glowing after removal of the igniting flame shall not exceed 5 seconds and none of the specimens shall drip flaming particles which ignite absorbent cotton.

"V-I": Average flaming and/or glowing after removal of the igniting flame shall not exceed 25 seconds and the glowing does not travel vertically for more than ¼" of the specimen after flaming ceases and glowing is incapable of igniting absorbent cotton.

"V-II": Average flame and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the instant invention, as "burns". Further, UL-94 requires that all test bars in each test group must meet the V type rating to achieve the particular classification. Otherwise, the 5 bars receive the rating of the worst single bar. For example, if one bar is classified as V-II and the other four (4) are classified as V-0, then the rating for all would be V-II.

The barrier properties for each of the ensuing examples were determined using Modern Controls, Inc. instruments. Water vapor transmission rate (WVTR) measurements were obtained on an IRD-2C instrument pursuant to ASTM F-372-73; carbon dioxide data ($CO_2TR$) were obtained using a Permatran-C instrument; and, oxygen transmisson rates ($O_2TR$) were determined using an OX-TRAN 100 instrument. The methods used to obtain WVTR and $CO_2TR$ data are based on infrared analysis whereas the $O_2TR$ data are based on infrared analysis whereas the $O_2TR$ measurements are based on a coulometric method. The WVTR measurements are expressed in grams/24 hrs./100 in.$^2$/mil at 100° F. and 90% relative humidity (RH) whereas those of $CO_2TR$ and $O_2TR$ are expressed in cc/24 hrs./100 in.$^2$/mil/atmosphere.

EXAMPLE 1

Into a mixture of 74.3 parts of pure 2,2'-dichloro-4,4'-isopropylidenephenol (DCBPA) (mp 91°–92° C.; 0.25 parts mole), 300 parts water, 300 parts methylene chloride, 0.47 parts phenol and 0.5 parts triethylamine were introduced, at ambient temperature, 30 parts phosgene over a period of 30 minutes while maintaining the pH of the two-phase system at about 11; i.e., pH 10–12.5, by simultaneously adding a 25% aqueous sodium hydroxide solution. At the end of the addition period, the pH of the aqueous phase was 11.7 and the DCBPA content of this phase was less than 1 part per million (ppm) as determined by ultraviolet analysis.

The methylene chloride phase was separated from the aqueous phase, washed with an excess of dilute (0.01 N) aqueous HCl and then washed three times with deionized water. The polymer was precipitated by adding the neutral and salt-free methylene chloride solutions to an excess of methanol and filtering off the white polymer which was dried at 95° C. The resultant, pure DCBPA-polycarbonate had an intrinsic viscosity (IV) in methylene chloride at 25° C. of 0.551 dl/g. Its flame retardant and barrier properties are set forth in the Table.

EXAMPLE 2

The procedure of Example 1 was repeated, except that 4,4'isopropylidenediphenol, (BPA) was substituted, in equivalent amounts, for DCBPA. The pure BPA-polycarbonate had an IV of 0.560 dl/g. Its flame retardant and barrier properties are listed in the Table.

EXAMPLE 3

The procedure of Example 1 was repeated, except that the DCBPA was replaced with a DCBPA preparation that was obtained by a conventional chlorination technique; i.e., by the process described in U.S. Pat. No. 3,957,886. The off-white polymers obtained had an intrinsic viscosity of 0.33 dl/g and was far too brittle to yield unbroken test specimens suitable for the flammability and barrier evaluations.

EXAMPLE 4

The procedure of Example 1 was repeated, except that DCBPA was replaced with an equivalent amount of a ternary diphenol composition containing the following statistical mixture:

|  | Composition (mole %) |
|---|---|
| 4,4'-isopropylidenediphenol | 27.2 |
| 2-chloro-4,4'-isopropylidenediphenol | 49.0 |
| 2,2'-dichloro-4,4'-isopropylidenediphenol | 23.8 |

EXAMPLE 5

The procedure of Example 1 was repeated, except that an equivalent amount of a 75 weight % of DCBPA-25 weight % BPA mixture was used in place of DCBPA. A copolycarbonate was obtained having an IV of 0.60 dl/g and that yielded colorless, transparent moldings or film. Its flame retardant and barrier properties are listed in the Table.

EXAMPLE 6

The procedure of Example 1 was repeated, except that an equivalent amount of a 55 weight % of DCBPA-45 weight % BPA mixture was used in place of DCBPA. The resulting copolycarbonate, which yielded tough, transparent test objects and films, had an IV of 0.54 dl/g. Its flame retardant and barrier properties are listed in the Table.

EXAMPLE 7

The procedure of Example 1 was repeated, except that an equivalent amount (65.5 parts by weight; 0.25 parts mole) of 2-chloro-4,4'-isopropylidenediphenol (melting point 105.5°–107° C.) was employed in place of the DCBPA. The resultant white polymer had an IV of 0.55 dl/g and its flame retardant and barrier properties are listed in the Table.

EXAMPLE 8

The procedure of Example 1 was repeated, except that DCBPA was replaced by an equivalent amount of 2,2'-dibromo-4,4'-isopropylidenediphenol (96.5 parts by weight, melting point 77°–79.5° C.). The resultant polymer had an IV of 0.54 dl/g and was cast into a film. Its WVTR value is listed in the Table.

EXAMPLE 9

The procedure of Example 1 was repeated, except that an equivalent amount (69.1 parts by weight) of 2-chloro-2'-methyl-4,4'-isopropylidenediphenol, melting point 110.5°–112° C., was substituted for DCBPA. A colorless polycarbonate was obtained, having an IV of 0.54 dl/g, which was cast into a film. Its WVTR value is listed in the Table.

EXAMPLE 10

The procedure of Example 1 was repeated, except for replacing DCBPA with an equivalent amount of 2,2',6,6'-tetrachloro-4,4'-isopropylidenediphenol (91.0 g). A low molecular weight polycarbonate was obtained that was unsuitable for the molding of test specimens because of its brittleness.

EXAMPLE 11

The procedure of Example 1 was repeated, except that DCBPA was replaced by an equivalent amount of the isomeric 2,6-dichloro-4,4'-isopropylidenediphenol (melting point 101.5°–103° C.). The resultant polycarbonate had an IV of 0.555 and was cast into a film. Its WVTR value is listed in the Table.

EXAMPLE 12

The procedure of Example 1 was repeated, except that DCBPA was replaced by an equivalent amount of 2,2'-dichloro-4,4'-(1-ethylethylidene)diphenol (77.8 parts by weight). The resultant polycarbonate had an IV of 0.514 dl/g which was cast as a film from methylene chloride. Its WVTR value is listed in the Table.

EXAMPLE 13

The procedure of Example 1 was repeated, except that DCBPA was replaced by an equivalent amount of 2,2'-dichloro-4,4'-(1-ethylpropylidene)diphenol (melting point 108°–109.5° C.) (81.3 parts by weight). The resultant polycarbonate had an IV of 0.470 dl/g and was cast into a film. Its WVTR value is listed in the Table.

EXAMPLE 14

The procedure of Example 1 was repeated, except for substituting the DCBPA an equivalent amount of an equimolar mixture of 2,2'-dichloro-6,6'-dimethyl-4,4'-cyclohexylidenediphenol (melting point 136.0 °–137.5° C.; 45.7 parts by weight) and BPA (melting point 155°–156° C.; 78.5 parts by weight). The resultant polymer had an IV of 0.543 dl/g and was cast into a film. Its WVTR is listed in the Table.

EXAMPLE 15

To a well stirred slurry of 57.0 parts of 4,4'-isopropylidenediphenol (BPA), in 700 parts of methylenechloride, that had been purged by a steady stream of nitrogen gas, was introduced, concomitant with the purging by nitrogen, a slow stream of chlorine gas, 20.0 parts, in the course of 4 hours. During this period, a gentle reflux was maintained at between 32° and 36° C. At about half-way through, a clear, colorless solution resulted, that stayed clear until the end of the reaction. A sample analyzed by gas chromatography had the following composition:

|  | Composition (mole %) |
| --- | --- |
| 4,4'-isopropylidenediphenol | 25.8 |
| 2-chloro-4,4'-isopropylidenediphenol | 51.0 |
| 2,2'-dichloro-4,4'-isopropylidenediphenol | 23.0 |
| 2,2',6-trichloro-4,4'-isopropylidenediphenol | 0.2 |

Employing this solution in Example 1 in place of the DCBPA solution, a colorless tough polycarbonate composition (random copolycarbonate) was obtained having an IV of 0.593 dl/g. Its flame retardant and barrier properties are listed in the Table.

Table

Flame Retardant and Barrier Properties of Polycarbonates

| Example | Flame Retardancy (UL-94) Sample Thickness | | WVTR | $CO_2TR$ | $O_2TR$ |
| --- | --- | --- | --- | --- | --- |
|  | 1.56mm | 3.13mm |  |  |  |
| 1 | V-0 | V-0 | 1.0 | 17.6 | 10.0 |
| 2 | V-II | Burns | 10.0 | 875.0 | 200.0 |
| (a)3 | — | — | — | — | — |
| 4 | V-0 | V-0 | 3.2 | 143.0 | 76.0 |
| 5 | V-0 | V-0 | 1.9 | 64.0 | 42.0 |
| 6 | V-0 | V-0 | 3.1 | 136.0 | 68.0 |
| 7 | V-0 | V-0 | 3.6 | 124.0 | 70.3 |
| *8 | — | — | 3.1 | — | — |
| *9 | — | — | 3.4 | — | — |
| (a)10 | — | — | — | — | — |
| *11 | — | — | 6.18 | — | — |
| *12 | — | — | 1.94 | — | — |
| *13 | — | — | 1.71 | — | — |
| *14 | — | — | 5.9 | — | — |
| 15 | V-0 | V-0 | 3.3 | 131.0 | 70.8 |

(a)could not be tested
*cast into a film

The findings set forth in the foregoing examples dramatically illustrate that, the mono- and dichlorinated polycarbonates have surprisingly far superior water vapor barrier properties than one would expect from either the unsubstituted or tetrachlorinated polycarbonates. Similar dramatic improvement in gas barrier properties were also obtained with mono- and dichlorinated polycarbonates as compared with unsubstituted or tetrachlorinated polycarbonates as can be seen from the results listed in the Table.

As shown in the Table and in the Examples, these unexpected improvements in water vapor transmission and gas barrier properties are most dramatic when the aromatic polycarbonate predominantly contains a dihalodiphenol as the monomeric building block.

What is claimed is:

1. A flame retardant, high molecular weight aromatic polycarbonate having an I.V. of 0.40–1.0 dl/g and improved water vapor transmission and gas barrier properties, said polycarbonate being represented by the general formula

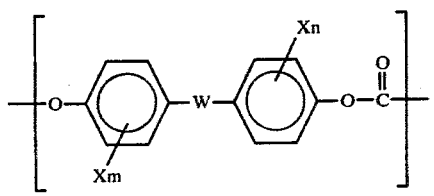

wherein Xm and Xn can each independently be a halogen, a $C_1$-$C_4$ alkyl, and mixtures thereof provided that at least either Xm or Xn is a halogen; m and n are each 0.1–2.5 with the proviso that when either Xm or Xn is a halogen, then m plus n equal at least 0.1, but no more than about 2.5; and, W can be a member selected from the following group:

(a) $-(CH_2)_r-$ wherein r is an integer of 0–10 with the proviso that when Xm and Xn are chlorine and m and n are each 1, r is 0 or 2–10;

(b)

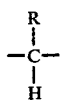

wherein R is a member of the group consisting of $C_1$-$C_{10}$ alkyl and $C_6$-$C_{14}$ aryl;

(c)

wherein R and R' can each independently be the same as R in (b) above;

(d)

wherein p and q can each independently be 0–1; and (e) —O—.

2. The polycarbonate of claim 1 wherein Xm and Xn are each chlorine.

3. The polycarbonate of claim 1 wherein Xm and Xn are each bromine.

4. The polycarbonate of claim 1 wherein Xm is chlorine and Xn is a $C_1$-$C_4$ alkyl.

5. The polycarbonate of claim 1 wherein Xm is bromine and Xn is a $C_1$-$C_4$ alkyl.

6. The polycarbonate of claim 1 wherein Xn is chlorine and Xm is bromine.

7. The polycarbonate of claim 1 wherein Xn is a mixture of chlorine and bromine and Xm is a $C_1$-$C_4$ alkyl.

8. The polycarbonate of claim 1 wherein m plus n equal 1.5.

9. The polycarbonate of claim 1 wherein W is (b).

10. The polycarbonate of claim 1 wherein W is (c).

UNITED STATES PATENT AND TRADEMARK OFFICE
CERTIFICATE OF CORRECTION

PATENT NO. : 4,195,157
DATED : March 25, 1980
INVENTOR(S) : Victor Mark

It is certified that error appears in the above-identified patent and that said Letters Patent are hereby corrected as shown below:

Column 1, line 33 --property to--
   should be --property of--

Column 2, line 50 --integer of 1-10--
   should be --integer of 0-10--

Column 5, line 20 --are rated earlier--
   should be --are rated either--

Column 9, line 21 -- (a) $+CH_2+_R$ --
   should be -- (a) $+CH_2+_r$ --

Signed and Sealed this

Twenty-seventh Day of October 1981

[SEAL]

Attest:

*Attesting Officer*

GERALD J. MOSSINGHOFF
*Commissioner of Patents and Trademarks*